Jan. 7, 1958   L. C. BANNISTER ET AL   2,819,160
PROCESS FOR REDUCING THE METALLOID CONTENT OF IRON
Filed May 28, 1956
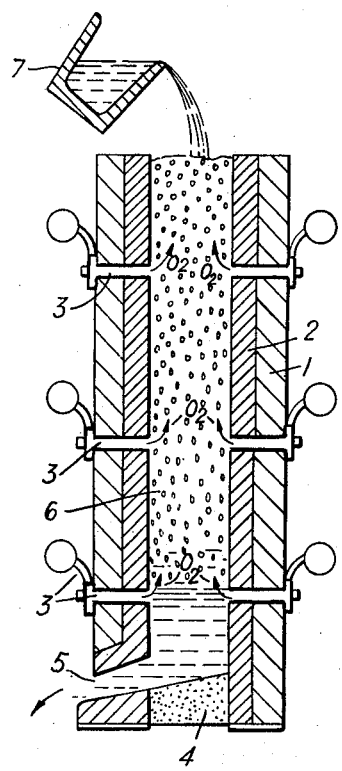
LEONARD CHARLES BANNISTER
WILLIAM JOHN BADENOCH CHATER
JAMES ANTHONY CHARLES
Inventor
By
Attorney United States Patent Office
2,819,160
Patented Jan. 7, 1958

2,819,160

PROCESS FOR REDUCING THE METALLOID CONTENT OF IRON

Leonard Charles Bannister, South Croydon, England, William John Badenoch Chater, Croydon, England, and James Anthony Charles, Shortlands, England, assignors to The British Oxygen Company Limited, a British company Application May 28, 1956, Serial No. 587,893

Claims priority, application Great Britain June 2, 1955

10 Claims. (Cl. 75—52)

The present invention relates to the manufacture of steel and more particularly to the removal of metalloids such as sulphur, phosphorus, manganese and silicon from molten iron as a step in the formation of steel.

Molten iron from the melting or blast furnace normally contains considerable contents of such metalloids, and where the iron is subsequently to be refined in the open hearth, the Bessemer or Thomas converter, electric furnace, or by the top blown oxygen process it is desirable that these contents should be reduced, in order to reduce the slag volume to be handled during the subsequent refining process.

It is know that such metalloid removal can be effected by treating the molten pig iron in a ladle, mixer or the latest rotary furnaces with a stream of oxygen prior to its entry into the open hearth, electric furnace or converter by the use of an oxygen lance or jet.

It is an object of the present invention to provide a process for the removal of metalloids from molten iron which is more efficient, economical and convenient than the processes heretofore in use.

Steelmaking in the converter, open hearth or electric furnace is a batch process and it is a further object of the present invention to make steel from iron continuously.

According to the present invention, a process for reducing the metalloid content of iron comprises passing the molten iron downwardly through a tower containing packing material, pre-heated to a temperature such that the molten metal does not freeze during its passage through the tower, in countercurrent flow to a stream of oxygen or oxygen containing gas in such manner that an oxidising zone is produced at the bottom of the tower and a reducing zone at the top of the tower. The packing material may be a material which will assist in the metalloid removal, for example, limestone or lime, or a mixture of limestone or lime and coke, or lime-coated coke. Alternatively, it may consist of inert refractory material.

If desired, one or more fluxing agents may be included in the packing materials. Examples, of such fluxing materials are soda ash, iron ore, millscale, iron oxide and fluorspar, and mixtures of these. In addition, the packing material may also include slag, which may be slag tapped from the tower itself or produced in a separate steelmaking process or made specially to the required composition.

The gas stream may consist of pure oxygen, air, oxygen enriched air, oxygen in admixture with carbon dioxide or steam or any other oxygen containing gas (or admixture of these gases), the oxygen content of which, together with oxygen available from any of the above-mentioned oxidising agents, is sufficient to achieve the desired metalloid oxidation.

It is essential to conduct the process of steelmaking according to the present invention in such a way that the gas stream introduced into the furnace which consists of the said gases such as pure oxygen air, oxygen enriched air, oxygen admixed with carbon dioxide or steam, or any other oxygen containing gas or admixture of these gases maintained an oxidising atmosphere in the lower part of the furnace. As the reactions of oxidation of carbon and that of slag formation proceed, the character of the gaseous mixture changes from that of being oxidising to that of reducing. As a result of it the upper zone of the furnace below the liquid iron feed is maintained predominantly in the reducing conditions. Such a distribution of the two zones, the oxidising zone at the bottom of the furnace, followed up by the reducing zone, can be produced by careful control of the rate and composition of the bottom gas stream on one hand, and the rate of charging of molten iron, coke, slag forming substances, and fluxing agents on the other.

It may also be noted that in the process according to the present invention the hot gases ascending above the level of the liquid iron feed carry substantial quantities of fumes which contain among other components iron oxide in a finely subdivided powder form. This iron oxide powder is deposited in the course of ascending through the slag forming charge, which consists of lime or limestone, and being in a finely subdivided state reacts easily with lime or limestone, forming a layer of slag on the surface. The presence of slag coated lime or limestone particles has a favourable effect on the main slag forming process below the liquid iron feed.

Another important advantage of the formation of slag on the surface by the reaction between the finely subdivided iron oxide and lime or limestone is a considerable reduction in fume formation in the hot exit gases. The iron oxide particles are retained by the reaction with lime or limestone on the surface and do not leave the furnace with the exit gases, and thus do not contribute to the pollution of the surrounding atmosphere.

The hot exit gases leaving the top of the tower may be employed to impart a degree of preheat to the ingoing gases by recuperative or regenerative system. These top gases contain a gas rich in carbon monoxide. If these gases are burnt with air or oxygen or oxygen enriched air, they provide a source of heat energy, suitable for example for driving an oxygen plant. The carbon dioxide produced by combustion could, after purification, be returned to the tower, as a means of reducing the oxygen required, the fuel required, and as a coolant.

While, in many cases, the required reduction in metalloid content may be achieved by a single passage of the molten iron through the tower, in certain cases where the metalloid content is high or where its reduction to a very low value is required, a number of passages through the tower may be necessary or desirable. This will depend on the height and activity of the tower, and the composition of the iron to be treated.

A suitable form of tower for use in the process of the present invention is shown in cross-section in the accompanying drawing. The tower 1 is made of insulating brick and is provided with a lining 2 of a suitable refractory material, such as dolomite, silica, chromite, magnesite, alumina or sillimanite. Tuyeres 3 for the introduction of the oxygen or oxygen-containing gas are provided at three levels up the tower and, if desired, may be provided with appropriate cooling means. Alternatively, the tuyeres may be on more or less levels than three or else all at the bottom of the tower. In the form of tower illustrated, the tuyeres 3 are shown as horizontal but, if desired, their direction may be varied so as to achieve control of the oxidation reaction. At the bottom of the tower is located a renewable hearth 4 sloping to an exit 5 for the treated metal and slag. The tower 1 is filled with a bed 6 of packing material.

In operation, the tower is initially heated by any appropriate method. For example, the empty tower may be charged with coke or like solid fuel to about one-third full and brought to a bright-red heat by passage of oxygen or oxygen-containing gas through the tuyeres. Mixtures of limestone and coke are subsequently added until the tower is full and molten metal is then poured into the tower from a ladle (indicated at 7). The height of the bed 6 is maintained during passage of the molten metal by further additions of limestone or, if necessary, of a mixture of limestone and coke. As previously stated, one or more fluxing materials and/or slag may be charged together with the limestone while filling the tower and added as the bed falls during operation. The slag used may be tapped from the tower itself or from other steelmaking apparatus or may be made specially to the required composition.

The final metal product and the slag formed collect on the hearth 4 and are discharged simultaneously through the exit 5 to a forehearth where they are separated. The slag may then be recycled, if desired, to the top of the tower. Alternatively, the tower may be so constructed that the metal product and slag are retained on the hearth, tappings at two levels being made for the separation of metal from slag.

Powdered fluxing materials may, if desired, be introduced into the tower through the tuyeres 3 with the oxidising gas stream, and, if required carburising or other steel finishing additions may be similarly added through conveniently placed auxiliary tuyeres with a reducing or inert gas.

Instead of preheating the tower by the combustion of coke, the bed 6 may be introduced into place and the whole preheated by the combustion of a liquid or gaseous fuel passed through the tower. Suitable fuels are oil, coke oven gas, producer gas, water gas, ethylene, propane, butane, methane or other carbonaceous gases, hydrogen, and mixtures of these fuels. As a further alternative, the packed tower may be heated electrically.

As an example, using a tower of total height 3 ft. 6 ins. and provided with four tuyeres of 5/16 inch bore directed towards the centre and upwardly at an angle of 45° for the introduction of oxygen, the injection points being some 9 inches above the bottom of the tap hole, a pig-iron containing 3.15% C, 2.31% Si, 0.46% Mn, 0.044% S and 1.32% P was converted after one passage through the tower to a metal containing 3.05% C, 2.08% Si, 0.45% Mn, 0.012% S and 1.29% P.

In a further example, a pig iron containing 2.80% Si and 0.036% S, possessed after one pass 2.51% Si and 0.016% S; after two passes 2.48% Si and 0.007% S; and after three passes 2.38% Si and 0.006% S.

In a further example, using a tower of total height 9 feet and provided with twelve tuyeres in three groups of four at different levels, a pig iron containing 3.5% C, 1.1% Si, 0.5% Mn and 0.88% P, was converted after one passage to a metal product containing 3.2% C, 0.58% Si, 0.2% Mn and 0.69% P.

The process of the present invention may in some circumstances possess the advantages inherent to continuous processes in comparison with batch ones. Thus, for example, heat recovery may be more efficient, since after the furnace has once been heated up, there is no heat lost by cooling-down and warming-up between batches. Moreover owing to the countercurrent contact between oxygen and metal throughout the height of the tower, the chemical reaction taking place is more efficient than in batch processes in which the oxygen can be injected at only a comparatively few points in the bath. Finally, there is a reduction in the amount of fume formed, since fume formed in the lower stages of the tower will tend to be absorbed in the higher stages.

While the process has been more particularly described with reference to the reduction in metalloid content as a prior step to the final refining of the iron, it will be apparent that by suitable choice of tower filling material, it will be possible to achieve the continuous conversion of the iron to steel by passage through the tower.

We claim:
1. A process for reducing the metalloid content of iron which comprises passing the molten iron downwardly through a tower packed with predominantly non-reducing material preheated to a temperature such that the molten iron does not freeze during its passage through the tower, in counter-current flow to a stream of a gas selected from the group consisting of pure oxygen and oxygen-containing gas mixtures, in such manner that an oxidising zone is produced and maintained at the bottom of the tower and a reducing zone at the top of the tower.

2. A process according to claim 1 wherein the packing material is selected from the group consisting of lime, limestone.

3. A process according to claim 2 wherein the packing material includes at least one fluxing agent.

4. A process according to claim 2 wherein the packing material includes at least one fluxing agent selected from the group consisting of soda ash, iron ore, millscale, iron oxide, and fluorspar.

5. A process according to claim 3 wherein the fluxing agent is introduced in suspension in the gas stream.

6. A process according to claim 1 wherein the packing material includes slag, which has been tapped off at the bottom of the tower and re-introduced at at least one higher level.

7. A process according to claim 1 wherein the gas stream entering the tower is preheated by heat exchange with hot gases leaving the tower.

8. A process according to claim 1 wherein the packing material is preheated combustion of a fuel previously admixed with said packing material.

9. A process according to claim 1 wherein the packing material is preheated electrically.

10. A process according to claim 8 wherein said fuel is coke.

References Cited in the file of this patent

UNITED STATES PATENTS

| 99,677 | Hubbell | Feb. 8, 1870 |
| 645,205 | Hawkins | Mar. 13, 1900 |
| 790,397 | Price | May 23, 1905 |
| 859,572 | McDonald | July 9, 1907 |
| 1,549,313 | Jackson et al. | Aug. 11, 1925 |
| 1,937,064 | Moore | Nov. 28, 1933 |
| 2,577,764 | Hulme | Dec. 11, 1951 |
| 2,609,288 | Stuart | Sept. 2, 1952 |

FOREIGN PATENTS

| 3,386 | Great Britain | 1871 |
| 4,999 | Great Britain | 1876 |
| 444,809 | France | Aug. 17, 1912 |